No. 727,446. PATENTED MAY 5, 1903.
J. G. RICHERT.
DRAINING OR SEWERAGE SYSTEM.
APPLICATION FILED FEB. 12, 1902.
NO MODEL. 2 SHEETS—SHEET 1.
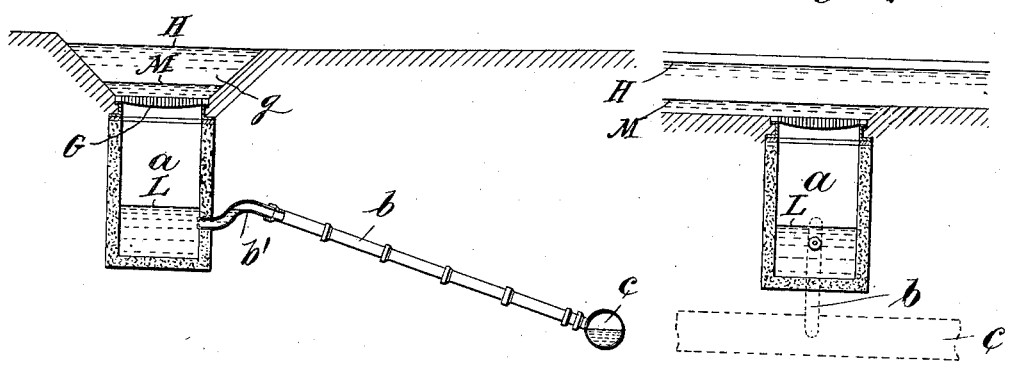
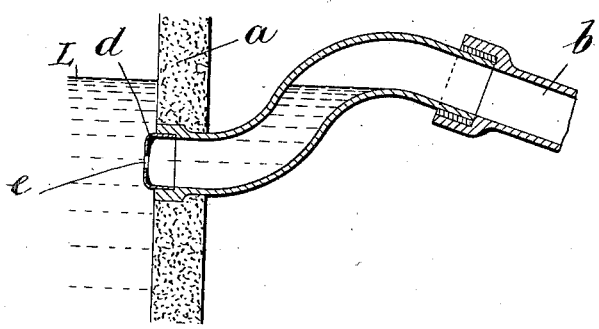

No. 727,446. PATENTED MAY 5, 1903.
J. G. RICHERT.
DRAINING OR SEWERAGE SYSTEM.
APPLICATION FILED FEB. 12, 1902.
NO MODEL. 2 SHEETS—SHEET 2.
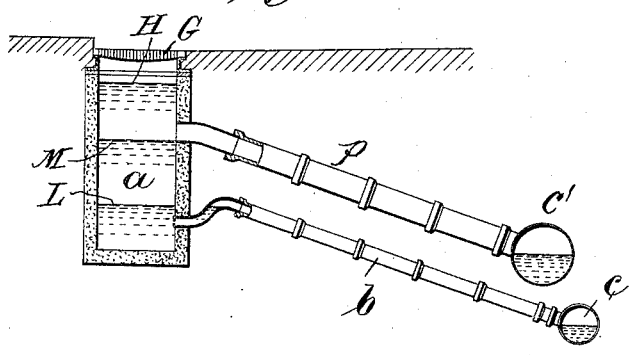
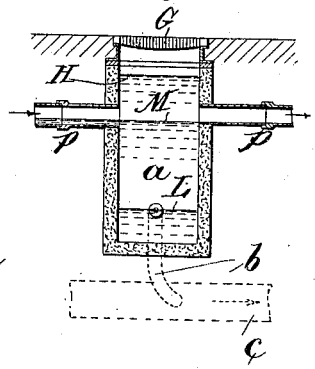
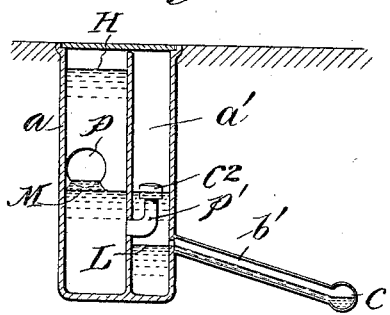
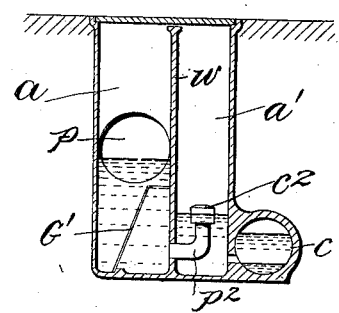
Inventor.
Johan Gustaf Richert.
by Henry Orth
Attys.
Witnesses:

No. 727,446. Patented May 5, 1903.

UNITED STATES PATENT OFFICE.

JOHAN GUSTAF RICHERT, OF STOCKHOLM, SWEDEN.

DRAINING OR SEWERAGE SYSTEM.

SPECIFICATION forming part of Letters Patent No. 727,446, dated May 5, 1903.

Application filed February 12, 1902. Serial No. 93,743. (No model.)

*To all whom it may concern:*

Be it known that I, JOHAN GUSTAF RICHERT, a subject of the King of Sweden and Norway, residing at Stockholm, Sweden, have invented certain new and useful Improvements in and Relating to Draining or Sewerage Systems; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to the drainage of towns and cities, and this has hitherto been effected in various ways, to wit: first, by the so-called "combined" system, whereby both surface and house drainage is effected through the same underground sewers; second, by the so-called "separate" system, whereby the surface drainage and the house-drainage are effected through separate conduits, the former, for instance, through surface drains and the latter through underground drains or both through separate underground drains.

The cheapest and most convenient means of getting rid of surface water and sewage has been by means of watercourses, into which the drains discharge; but, as is well known, this becomes more and more impracticable and in many cases impossible from a hygienic standpoint, especially in the more densely-populated countries, owing to the pollution of the water into which the sewage is discharged.

The combined system is recognized as the best from a hygienic standpoint; but it is very expensive, owing to the fact that the capacity of the sewers must be such as to be capable of carrying off not only all the town or city sewage and the normal surface waters, but also the whole of the abnormal surface water in case of heavy rains or a rapid thaw of snow, as otherwise the buildings in the low-lying districts are liable to be flooded, and this is also the case when the combined sewage and surface water are discharged into tide-water or tidal watercourses.

The separate system of drainage is the most economical whenever it is practicable to discharge the sewage and rain-water into a watercourse.

Where for hygienic reasons it has been impracticable to discharge sewage into a watercourse, means are provided for the disposal of the sewage, which is generally discharged into reservoirs and removed therefrom by pumping for further treatment and purification of the liquid constituents. In this case the combined system presents the serious disadvantage of having frequently to deal with abnormally large quantities of water, rendering its purification to a sufficient extent to admit of its discharge into a watercourse very expensive. Although this disadvantage is not inherent to the separate system where the house-sewage alone will then be dealt with, the surface water being allowed to discharge into a watercourse, yet it is obvious that in this case the discharge of the surface waters into such watercourse is also impracticable, owing to the pollution of such surface water, especially in cities having extensive street traffic.

My invention has for its object a system of drainage whereby the above difficulties and disadvantages are obviated and whereby the sewage to be disposed of otherwise than by its discharge into a watercourse will at no time be diluted with abnormal quantities of surface water and whereby the latter may in a comparatively pure condition be discharged into a watercourse and the flooding of houses prevented.

My system is based on the more economical separate system, the surface water being carried off either through surface or underground drains.

That my invention may be fully understood I will describe the same in detail, reference being had to the accompanying drawings, in which—

Figures 1 and 2 are fragmentary cross and longitudinal sectional views of a street, catch, or intercepting trap, a sewer and its connection with said trap, the excess of rain-water being here carried off through a surface gutter; and Fig. 3 is a sectional detail view of the sewer-pipe and its connection with the intercepting-trap. Figs. 4 and 5 are views similar to Figs. 1 and 2, showing separate underground conduits for carrying off the sewage and the excess of surface water; and Figs. 6 and 7 are vertical cross-sections showing modified constructions of intercepting-traps and their connection with the sewer.

In carrying out my invention and with a view to reducing the dimensions of the intercepting-trap I preferably provide such a trap for comparatively small areas to be drained of surface water—say, for instance, one for each square or block.

In Figs. 1 and 2 the trap $a$ is in communication with a street-gutter $g$; the sewer $c$ on a lower level than the lower end or bottom of the trap being connected thereto by a pipe $b$ at a point above the bottom of the trap, the pipe $b$ being bent at $b'$ into or substantially into a gooseneck. To the inlet of pipe $b$ is connected a cap $d$, provided with a port or aperture $e$, the diameter or area of which is such as to admit therethrough all the surface water flowing into the trap under normal conditions of rainfall, but of insufficient area to drain a greater or abnormal volume of surface water. So long as the level of the water in the basin remains normal or low, as indicated by L, no water passes into the sewer $c$ while the pipe is sealed. In case of a normal rainfall the water in the basin may rise from low to mean water level, as indicated by M, all the water passing into the sewer; but when the water rises to the high-water mark, as indicated by H, then the opening leading to pipe $b$ will be of insufficient area to admit of the passage of all the surface water, which then flows along the surface gutter $g$ to the point of discharge. Now it will be obvious that even in case of a sudden very heavy rainfall the more polluted surface water from the roofs, yards, alleys, and streets will be discharged into the sewer, so that by the time the level of the water at the intercepting-trap rises to high-water level the water is comparatively or sufficiently pure to admit of its discharge into a watercourse.

Inasmuch as a definite quantity of surface water reaches the sewer during an abnormal rainfall or a sudden thaw, the capacity of such sewer need not be much greater than required to carry off the house-sewage, while its flooding and the backing of sewage into buildings is absolutely prevented.

In Figs. 4 to 7 I have shown my invention as applied to a separate system of sewage, wherein both drains for sewage and surface water are underground drains, the separate surface-water drain being connected to the intercepting-basin at a higher level than the sewer or sewage-drain proper. As shown in Figs. 4 and 5, so long as the water is at the lower level L none of it will flow to the sewer $c$, while so long as the level of the water remains medium, as at M, all of the water above the level of the bend in the sewer-trap $b$ will flow to the sewer $c$, while as soon as the water-level rises above the lower edge of the inlet to separate surface-drain pipe $p$ it will begin to flow to the surface drain $c'$, and this will be the case to whatever level the water may rise in the trap $a$ above the inlet to the pipe $p$, while only a definite volume of water, depending on the area of the port or opening $e$ in sewer connection $b$, will flow to the sewer.

Obviously if the surface-water drain $c'$ and its connection $p$, with the trap $a$, are of sufficient capacity to carry off any abnormal volume of surface water the street will not be flooded, while no greatly-polluted surface water will flow through pipe connection $p$, since the first fall of water, washing the streets, alleys, yards, and roofs, will be carried off through the sewer $c$.

In Fig. 6 I have shown the intercepting-trap $a$ provided with a delivery-chamber $a'$, connected to said trap at a predetermined point above the inlet to the sewer connection $b'$ by an upwardly-bent pipe $p'$, carrying at its upper end a valve-casing $c^2$ for a float-valve adapted to close the discharge-port in the upper face of said valve-casing whenever the level of the water in the basin $a$ rises above a normal medium level M, so that no water at all will flow from the basin $a$ to the sewer after the water in the basin has reached the lower edge of the inlet to the separate surface drain $c'$, to which the pipes $p$ are connected.

In the arrangement shown in Figs. 4 and 5 the sewer connection might become choked by sedimentary matter, and to prevent this a trap of comparatively great depth would be required. This, however, is effectually prevented by the provision of the delivery-chamber $a'$ and the check-valves, which check the flow of water to said chamber and to the sewer as soon as the level of water in the basin $a$ rises beyond a normal level, the trap $a$ acting as a settling-chamber, the level of the water in both chambers $a$ and $a'$ being practically constant under normal conditions.

In Fig. 7 I have shown an arrangement whereby the flow of surface water to the sewer $c$ is gradually reduced and finally cut off entirely. In this arrangement the sewer lies close to the delivery-chamber $a'$ of the trap $a$ and communicates therewith through a port of predetermined area, as is the case in the arrangement shown in Figs. 1 to 5. The pipe $p^2$, which connects the chamber $a'$ with the trap $a$, has its outlet at such an elevation relatively to the greatest vertical diameter of the sewer as to admit under normal conditions of a constant flow of surface water from the trap to chamber $a'$ and thence to the sewer $c$, and as the water rises in the trap $a$ the float-valve in the valve-casing $c^2$ also rises and gradually reduces the flow of water to chamber $a'$, which flow is completely cut off when the level of the water in basin $a$ rises above a medium level.

A guard or grating G', removable or hinged to the bottom of the basin $a$, so as to incline toward the partition-wall $w$, Fig. 7, may be provided to prevent sticks, leaves, &c., from choking up the pipe $p^2$.

Of course the delivery-chambers $a'$, Figs. 6 and 7, will be provided with manhole-covers, so that ready access may be had to said chambers for removal of sedimentary matter and inspection and cleaning of the float-valves and their casings. The traps themselves are either provided with a top grating if the surface water is admitted at the upper end or with manholes and covers if the surface water is admitted laterally.

Having thus described my invention, what I claim as new therein, and desire to secure by Letters Patent, is—

1. In combination, an intercepting-trap for surface water, a sewer for house-sewage, a port of predetermined area in communication with the trap and sewer allowing a definite normal volume of water to flow from said trap to the sewer, and a separate drain above the level of said port for, and capable of carrying off the excess of surface water in case of abnormal fall of such, for the purpose set forth.

2. In combination, an intercepting-trap, a sewer, a port of definite area in communication with said trap and sewer and a cut-off device organized to cut off the flow of water through said port when the level of such water rises above a predetermined level, and a separate drain above the aforesaid port for carrying off excess of surface water, for the purpose set forth.

3. In combination, an intercepting-trap, a delivery-chamber, a pipe in communication with the trap and rising upwardly in the delivery-chamber to a predetermined point, an outlet at the upper end of said pipe, means closing said outlet when the level of the water rises to or above the level of said outlet, a sewer in communication with the delivery-chamber at a point below the aforesaid pipe-outlet, and a separate drain in communication with the trap at a point above the pipe-outlet, for the purpose set forth.

In testimony that I claim the foregoing as my invention I have signed my name in presence of two subscribing witnesses.

JOHAN GUSTAF RICHERT.

Witnesses:
L. KALLENBERG,
A. NORDBLOM.